(12) United States Patent
Hiraide et al.

(10) Patent No.: US 10,669,606 B2
(45) Date of Patent: *Jun. 2, 2020

(54) STAINLESS STEEL HAVING EXCELLENT BRAZEABILITY

(71) Applicant: NIPPON STEEL & SUMIKIN STAINLESS STEEL CORPORATION, Tokyo (JP)

(72) Inventors: Nobuhiko Hiraide, Hikari (JP); Atsutaka Hayashi, Hikari (JP)

(73) Assignee: NIPPON STEEL & SUMIKIN STAINLESS STEEL CORPORATION, Tokyo (JP)

( * ) Notice: Subject to any disclaimer, the term of this patent is extended or adjusted under 35 U.S.C. 154(b) by 214 days.

This patent is subject to a terminal disclaimer.

(21) Appl. No.: 15/555,678

(22) PCT Filed: Mar. 22, 2016

(86) PCT No.: PCT/JP2016/058987
§ 371 (c)(1),
(2) Date: Sep. 5, 2017

(87) PCT Pub. No.: WO2016/152854
PCT Pub. Date: Sep. 29, 2016

(65) Prior Publication Data
US 2018/0037968 A1    Feb. 8, 2018

(30) Foreign Application Priority Data

Mar. 26, 2015  (JP) ................................. 2015-063569

(51) Int. Cl.
*C21D 9/46*   (2006.01)
*C22C 38/58*  (2006.01)
(Continued)

(52) U.S. Cl.
CPC ............... *C21D 9/46* (2013.01); *C21D 6/004* (2013.01); *C21D 6/005* (2013.01); *C21D 6/008* (2013.01);
(Continued)

(58) Field of Classification Search
CPC ........ C21D 2211/001; C21D 2211/005; C21D 6/004; C21D 8/0205; C21D 9/46; C22C 38/00; F28F 21/083; Y02B 30/52
See application file for complete search history.

(56) References Cited

U.S. PATENT DOCUMENTS 9,150,947 B2 * 10/2015 Nishiyama ............ C22C 38/001
9,945,016 B2 *  4/2018 Inoue .................... C22C 38/001
(Continued)

FOREIGN PATENT DOCUMENTS

CA     2 829 874 A1    10/2012
CN     1519388 A        8/2004
(Continued)

OTHER PUBLICATIONS

NPL: English on-line translation for JP 2006152343, Jun. 2006 (Year: 2006).*
(Continued)

*Primary Examiner* — Jie Yang
(74) *Attorney, Agent, or Firm* — Birch, Stewart, Kolasch & Birch, LLP

(57) ABSTRACT

A stainless steel exhibiting an excellent brazeability includes in mass %: C: from 0.001% to 0.1%; Si: from more than 1.5% to 4.0%; Mn: from 0.05% to 4.0%; Cr: from 10.5% to 30%; Ni: 35% or less; N: from 0.001% to 0.4%; one or both of Ti: 0.002% to 0.030% and Al: 0.002% to 0.10%; and a balance being Fe and inevitable impurities, in which an Si content, a Ti content and an Al content satisfy Formula 1, and an oxide film with a composition satisfying Formula 2 is formed on a surface of the stainless steel, (Continued)

$$Si_m/(Ti_m+Al_m) \geq 40 \qquad \text{Formula 1}$$

$$1.2 \times Si_m Fe_m \leq Si_f/Fe_f \leq 5 \times Si_m/Fe_m \qquad \text{Formula 2}$$

in Formula 1 and Formula 2, a suffix "f" expresses the oxide film in a unit of atom %, and a suffix "m" expresses a base material in a unit of mass %.

18 Claims, 3 Drawing Sheets

(51) Int. Cl.
| | |
|---|---|
| *C22C 38/60* | (2006.01) |
| *C22C 38/00* | (2006.01) |
| *F28F 21/08* | (2006.01) |
| *C21D 6/00* | (2006.01) |
| *C21D 8/02* | (2006.01) |
| *C22C 38/02* | (2006.01) |
| *C22C 38/06* | (2006.01) |
| *C22C 38/42* | (2006.01) |
| *C22C 38/44* | (2006.01) |
| *C22C 38/48* | (2006.01) |
| *C22C 38/50* | (2006.01) |
| *C22C 38/54* | (2006.01) |

(52) U.S. Cl.
CPC ......... *C21D 8/0205* (2013.01); *C21D 8/0226* (2013.01); *C22C 38/00* (2013.01); *C22C 38/001* (2013.01); *C22C 38/008* (2013.01); *C22C 38/02* (2013.01); *C22C 38/06* (2013.01); *C22C 38/42* (2013.01); *C22C 38/44* (2013.01); *C22C 38/48* (2013.01); *C22C 38/50* (2013.01); *C22C 38/54* (2013.01); *C22C 38/58* (2013.01); *C22C 38/60* (2013.01); *F28F 21/083* (2013.01); *C21D 2211/001* (2013.01); *C21D 2211/005* (2013.01); *Y02B 30/52* (2013.01)

(56) References Cited

U.S. PATENT DOCUMENTS

| | | |
|---|---|---|
| 2004/0206427 A1 | 10/2004 | Iseda et al. |
| 2008/0089803 A1 | 4/2008 | Okada et al. |
| 2008/0107559 A1 | 5/2008 | Nishiyama et al. |
| 2011/0033731 A1 | 2/2011 | Kawano et al. |
| 2012/0085513 A1 | 4/2012 | Oku et al. |
| 2013/0336834 A1 | 12/2013 | Matsuhashi et al. |
| 2016/0002760 A1 | 1/2016 | Hiraide et al. |
| 2016/0079455 A1 | 3/2016 | Hatano et al. |

FOREIGN PATENT DOCUMENTS

| | | | |
|---|---|---|---|
| CN | 101151394 | A | 3/2008 |
| CN | 101194037 | A | 6/2008 |
| CN | 102459676 | A | 5/2012 |
| CN | 105209651 | A | 12/2015 |
| JP | 2004-100598 | A | 4/2004 |
| JP | 2004-205059 | A | 7/2004 |
| JP | 2005-171938 | A | 6/2005 |
| JP | 2006152343 | A  * | 6/2006 |
| JP | 2006-334602 | A | 12/2006 |
| JP | 2008-202846 | A | 9/2008 |
| JP | 2009-114471 | A | 5/2009 |
| JP | 2009-174040 | A | 8/2009 |
| JP | 2009-299182 | A | 12/2009 |
| JP | 2010-238806 | A | 10/2010 |
| JP | 2010-285683 | A | 12/2010 |
| JP | 2012-207259 | A | 10/2012 |
| JP | 2013-199661 | A | 10/2013 |
| JP | 2013-204044 | A | 10/2013 |
| JP | 2014-218728 | A | 11/2014 |
| WO | WO 2014/157104 | A1 | 10/2014 |

OTHER PUBLICATIONS

International Preliminary Report on Patentability and English translation of Written Opinion of the International Searching Authority dated Sep. 26, 2017, issued in PCT/JP2016/058987 (Forms PCT/IB/373 and PCT/ISA/237).
International Search Report (PCT/ISA/210) issued in PCT/JP2016/058987, dated May 17, 2016.
Written Opinion (PCT/ISA/237) issued in PCT/JP2016/058987, dated May 17, 2016.
Chinese Office Action and Search Report for corresponding Chinese Application No. 201680017554.X, dated Aug. 20, 2018, with English translation.
Extended European Search Report, dated Aug. 14, 2018, for corresponding European Application No. 16768757.3.
Canadian Office Action dated Sep. 19, 2018, issued in corresopnding Canadian Patent Application No. 2977619.

* cited by examiner

STAINLESS STEEL HAVING EXCELLENT BRAZEABILITY

TECHNICAL FIELD

The present invention relates to a stainless steel having an excellent brazeability, which is used as a member to be assembled by brazing. Examples of automobile components to be assembled by brazing include an EGR (Exhaust Gas Recirculation) cooler, an oil cooler, exhaust heat recovery equipment and a fuel delivery system component. Moreover, in a field of a hot water supplier, examples of the components to be assembled by brazing include a secondary heat exchanger of a latent heat recovery-type gas hot-water supplier, and a heat exchanger of a $CO_2$ refrigerant heat pump-type hot water supplier (trading as EcoCute (registered trademark)). In addition, various stainless steels are usable as a member to be assembled by brazing.

BACKGROUND ART

In recent years, in the automobile industry, due to growing awareness of environmental issues, exhaust gas regulations have been further tightened and measures for decreasing carbon dioxide emission have been taken. In addition to the measures from a fuel standpoint such as bioethanol and biodiesel fuels, measures for further decreasing a vehicle weight and installing an exhaust gas treatment device such as EGR, DPF (Diesel Particulate Filter) and a urea SCR (Selective Catalytic Reduction) system have been taken. Further, in order to improve a fuel efficiency, exhaust heat recovery equipment to recover exhaust heat has begun to be installed.

Among these, an object of the EGR cooler is to lower a combustion temperature and decrease NOx, which is a poisonous gas, by cooling engine exhaust gas with an engine cooling water and subsequently returning the exhaust gas to an intake side for recombustion. The exhaust heat recovery equipment is a system to heat the engine cooling water with the exhaust gas to use for warm-up of a heater and the engine. The exhaust heat recovery equipment is also called an exhaust heat recirculation system. This arrangement shortens a time between a cold start to an engine stop in a hybrid car, and contributes to an improvement in a fuel efficiency especially in winter.

Further, also in the field of the hot water supplier, application of the heat exchanger has been increased according to a widespread use of an environment-responsive device. In a gas hot-water supplier, a latent heat recovery-type gas hot-water supplier added with a secondary heat exchanger made of a stainless steel has been widespread in order to recover a latent heat from an exhaust gas having a high temperature approximately from 150 degrees C. to 200 degrees C., the exhaust gas having been usually discharged without any treatment. Moreover, a typical electric hot water supplier including a built-in heater has been increasingly switched to a $CO_2$ refrigerant heat pump-type hot water supplier (trading as EcoCute (registered trademark) which can decrease electric energy to ⅓ or less. A heat exchanger is also used in the $CO_2$ refrigerant heat pump-type hot water supplier.

Such a heat exchanger is required to have a favorable heat conductivity for a favorable heat efficiency, and an excellent corrosion resistance against exhaust gas condensate water since the heat exchanger is in contact with an exhaust gas. In automobile components, the EGR cooler and the exhaust heat recovery equipment are required to have much higher safety and more excellent corrosion resistance since leakage of a cooling water is likely to cause a critical breakage in the EGR cooler and the exhaust heat recovery equipment.

An austenitic stainless steel (e.g., SUS304 and SUS316L) with corrosion resistance and strength is generally used as a material for the heat exchanger.

Some heat exchangers are assembled by welding and others are assembled by brazing because of a complicated structure of the heat exchanger. A material for a heat exchanging portion to be assembled by brazing is required to have a favorable brazeability.

Patent Literature 1 discloses a brazing process of coating a phosphorus-containing nickel alloy by electroless plating onto a surface of a component of a heat exchanger made of a stainless steel material, and subsequently melting the phosphorus-containing nickel alloy in high temperature vacuum to use the molten substance as a brazing material. The usable stainless steel is exemplified by SUS304.

Patent Literature 2 discloses a cylindrical structural body usable as a brazed member made of an austenitic stainless steel, the cylindrical structural body being a part of an engine exhaust gas purifying device and housing a metal support supporting an exhaust gas purifying catalyst thereon. Patent Literature 3 discloses a common rail used for a low pressure fuel. Neither Patent Literature 2 nor Patent Literature 3 discloses a type of steels. Similarly, Patent Literature 4 discloses a heat exchanger pipe for a heat exchanger of an EGR gas cooler. Examples of an austenitic stainless steel used for a wavy fin structural body of the heat exchanger pipe include SUS304, SUS304L, SUS316 and SUS316L.

Patent Literature 5 discloses a composite material used for brazing, which is obtained by forming a brazing material layer having a multi-layer structure, in which a layer of Fe or Fe alloy, a layer of Ti or Ti alloy, and a layer of Ni or Ni alloy are layered, on a surface of a base material made of an alloy containing Ni. Herein, the base material made of an alloy containing Ni is exemplified by an austenitic stainless steel (e.g., SUS304) and a dual phase stainless steel.

Patent Literature 6 discloses an austenitic stainless steel having excellent corrosion resistance and brazeability and containing C: 0.080% or less, Si: from 1.2% to 3.0%, Mn: from 0.4% to 2.0%, P: 0.03% or less, S: 0.003% or less, Ni: from 6.0% to 12.0%, Cr: from 16.0% to 20.0%, Cu: from 0.2% to 3.0%, Mo: from 0.1% to 1.0%, Al: from 0.002% to 0.10%, and N: from 0.030% to 0.150%, so as to satisfy a relationship of $1.6 \leq Cu \times Si \leq 4.4$ and a relationship of $0.16 \leq 2N+Mo \leq 1.0$.

Patent Literature 7 discloses an austenitic stainless steel usable as member for an exhaust gas flow path, the austenitic stainless steel containing C: from 0.001% to 0.03%, Si: from 0.10% to 0.70%, Mn: from 0.10% to 1.00%, P: from 0.005% to 0.045%, S: 0.003% or less, Ni: from 18.00% to 40.00%, Cr: from 20.00% to 30.00%, Cu: 2.00% or less, Mo: from 3.00% to 8.00%, Al: 0.13% or less, and N: from 0.05% to 0.30% so as to satisfy a relationship of $Cr+2Mo+0.5Ni \geq 40$.

Patent Literature 8 discloses a ferritic stainless steel suitable for a heat exchanger member with Ni-braze or Cu-braze, the ferritic stainless steel containing C: 0.03% or less, Si: 3% or less, Mn: 2% or less, P: 0.005% or less, S: 0.03% or less, Cr: from 11% to 30%, Nb: from 0.15% to 0.8%, N: 0.03% or less so as to satisfy a relationship of $Nb-(C \times 92.9/12 + N \times 92.9/14) \geq 0.10$.

Patent Literature 9 discloses a ferritic stainless steel material used for brazing, the ferritic stainless steel material containing C: 0.03% or less, Si: from more than 0.1% to 3%, Mn: from 0.1% to 2%, Cr: from 10% to 35%, Nb: from 0.2% to 0.8%, and N: 0.03% or less, and having a partially recrystallization structure with from 10% to 80% of an area ratio of recrystallization particles generated by heating after cold working.

CITATION LIST

Patent Literature(s)

Patent Literature 1: JP2004-205059A
Patent Literature 2: JP2004-100598A
Patent Literature 3: JP2005-171938A
Patent Literature 4: JP2008-202846A
Patent Literature 5: JP2006-334602A
Patent Literature 6: JP2012-207259A
Patent Literature 7: JP2013-199661A
Patent Literature 8: JP2009-299182A
Patent Literature 9: JP2010-285683A

SUMMARY OF THE INVENTION

Problem(s) to be Solved by the Invention

An austenitic stainless steel (e.g., SUS304 and SUS316L) usable for general purpose is generally used as heat exchangers represented by an EGR cooler and an exhaust heat recovery equipment. Usage and a used amount of the austenitic stainless steel tend to be expanded. Accordingly, reduction of a material cost and an improvement in productivity have been demanded for manufacturing the heat exchangers. Use of an inexpensive ferritic stainless steel and a dual phase (ferrite+austenite) stainless steel can decrease the material cost.

In comparison between various stainless steels in terms of brazeability, brazeability of the ferritic stainless steel and the dual phase stainless steel cannot be said to be superior to brazeability of the austenitic stainless steel.

This is one of problems when using the ferritic stainless steel and the dual phase stainless steel for the heat exchangers such as the EGR cooler and the exhaust heat recovery equipment. Moreover, the austenitic stainless steel is also required to have further more favorable brazeability than a current brazeability.

The invention has been made in consideration of the above typical circumstances. An object of the invention is to provide an austenitic stainless steel, a ferritic stainless steel or a dual phase (ferrite+austenite) stainless steel, which is suitably usable as a member (e.g., a heat exchanger) to be assembled by brazing, the austenitic stainless steel exhibiting more excellent brazeability than that of a general austenitic stainless steel such as SUS304 and SUS316L, the ferritic stainless steel and a dual phase (ferrite+austenite) stainless steel being inexpensive and each having brazeability equivalent to that of the general austenitic stainless steel.

Means for Solving the Problem(s)

A summary of the invention capable of achieving the above object is as follows.

(1) According to an aspect of the invention, a stainless steel exhibiting an excellent brazeability include, in mass %: C: from 0.001% to 0.1%; Si: from more than 1.5% to 4.0%; Mn: from 0.05% to 4.0%; Cr: from 10.5% to 30%; Ni: 35% or less; N: from 0.001% to 0.4%; one or both of Ti: 0.002% to 0.030% and Al: 0.002% to 0.10%; and a balance being Fe and inevitable impurities, in which an Si content, a Ti content and an Al content satisfy Formula 1, and an oxide film with a composition satisfying Formula 2 is formed on a surface of the stainless steel, $$Si_m/(Ti_m+Al_m) \geq 40 \quad \text{Formula 1}$$

$$1.2 \times Si_m/Fe_m \leq Si_f/Fe_f \leq 5 \times Si_m/Fe_m \quad \text{Formula 2}$$

in which: in Formula 1 and Formula 2, an element with a suffix "f" expresses a content of the element in the oxide film, the content being indicated by a unit of atom %, and an element with a suffix "m" expresses a content of the element in the stainless steel that is a base material, the content being indicated by a unit of mass %.

(2) In the above arrangement, the stainless steel exhibiting an excellent brazeability further include, in mass %, at least one of: a first group of at least one of Sn: from 0.001% to 0.5%, Co: 0.01% to 0.5%, Bi: 0.001% to 0.01%, and B: 0.0002% to 0.005%;

a second group of at least one of Mo: 0.3% to 8%, W: 0.3% to 4%, V: 0.05% to 0.5%, Nb: 0.01% to 1%, Cu: 0.1% to 6%, Sb: 0.001% to 0.5%, Zr: 0.001% to 0.3%, Ga: 0.0001% to 0.01%, and Ta: 0.0001% to 0.01%; and a third group of at least one of Ca: 0.0002% to 0.005%, Mg: 0.0002% to 0.005%, and REM: 0.005% to 0.1%.

(3) In the stainless steel exhibiting an excellent brazeability, at least one of the Si content, the Ti content and the Al content respectively satisfy ranges below: Si: from 1.9% to 3.4%; Ti: from 0.003% to 0.020%; and Al: from 0.003% to 0.03%.

(4) In the above arrangement, the stainless steel exhibiting an excellent brazeability is used as a joined member for brazing with an Ni braze or a Cu braze.

(5) In the above arrangement, the stainless steel exhibiting an excellent brazeability is used for a heat exchanger.

(6) The stainless steel exhibiting an excellent brazeability is used for an automobile component that is an EGR cooler, an exhaust heat recovery equipment, or a fuel delivery component.

(7) The stainless steel exhibiting an excellent brazeability is used for a $CO_2$ refrigerant heat pump-type hot water supplier, a secondary heat exchanger of a latent heat recovery-type hot-water supplier, or a plate type heat exchanger According to the above aspects of the invention, a stainless steel having an excellent brazeability, which is used as a member to be assembled by brazing, can be provided. The stainless steel according to the above aspects of the invention can be suitably used for: automobile components such as an EGR cooler, oil cooler, exhaust heat recovery equipment and fuel delivery system components; a heat exchanger for a hot water supplier, such as a secondary heat exchanger of a latent heat recovery-type hot-water supplier operated by gas, and a plate type heat exchanger of an EcoCute (registered trademark) operated by electricity; and members to be assembled by brazing with use of Ni braze or Cu braze.

BRIEF DESCRIPTION OF DRAWING(S)

DESCRIPTION OF EMBODIMENT(S)

Exemplary embodiment(s) of the invention will be described in detail below.

An exemplary embodiment of the invention relates to a stainless steel having an excellent brazeability. Brazing is performed using a Ni braze or Cu braze at a temperature of from 950 degrees C. to 1200 degrees C. in vacuum or hydrogen atmosphere. At this time, an argon gas, nitrogen gas or the like for controlling or replacing a brazing atmosphere may be used in combination in some cases. In the brazing, a braze spreads over pieces of a base material to fill a gap between the pieces, thereby joining the pieces. When an oxide film is present on a surface of the base material, the braze doe not easily spread over the base material, thereby inhibiting brazeability.

On the surface of the stainless steel, an (Fe, Cr) oxide film which is rich in Cr is formed and thus an excellent corrosion resistance is exhibited. In order to ensure wettability, it is necessary to remove this film. Thus, in order to reduce the film, brazing is performed under conditions of a low vacuum degree or a low dewpoint. Specifically, brazing of the stainless steel is performed at a brazing temperature under conditions of a lower vacuum degree or a lower dew point than those at which at least Cr and $Cr_2O_3$ are in balance. Accordingly, the inventors consider that brazeability is improvable by concentrating an element effective for brazeability on the surface.

In light of the above background, the inventors have focused on alloy elements and a surface composition with respect to brazeability of the stainless steel and conducted an intensive study on the alloy elements and the surface composition.

In the description of comparison between Si and Fe contents in the steel and those in the oxide film, a suffix "m" is attached for expressing the Si and Fe contents (mass %) in the steel and a suffix "f" is attached for expressing the Si and Fe contents (atom %) in the oxide film.

As a result of consideration, it has been found effective for enhancing brazeability to contain Si having a predetermined or more amount in the stainless steel and to form an oxide film, in which Si is concentrated, in advance on a surface of the stainless steel. Specifically, the following conditions are found:

(1) containing Si of more than 1.5% and at a content of 40 times or more as much as the total amount of Ti and Al in the steel; and (2) setting a ratio (Si/Fe) between Si and Fe so that an atom % ratio $(Si_f/Fe_f)$ between an $Si_f$ amount and an $Fe_f$ amount contained in the oxide film on the surface is in a range from 1.2 times to 5 times as much as a mass % ratio $(Si_m/Fe_m)$ between an $Si_m$ amount and an $Fe_m$ amount contained in the steel.

Figure 1:
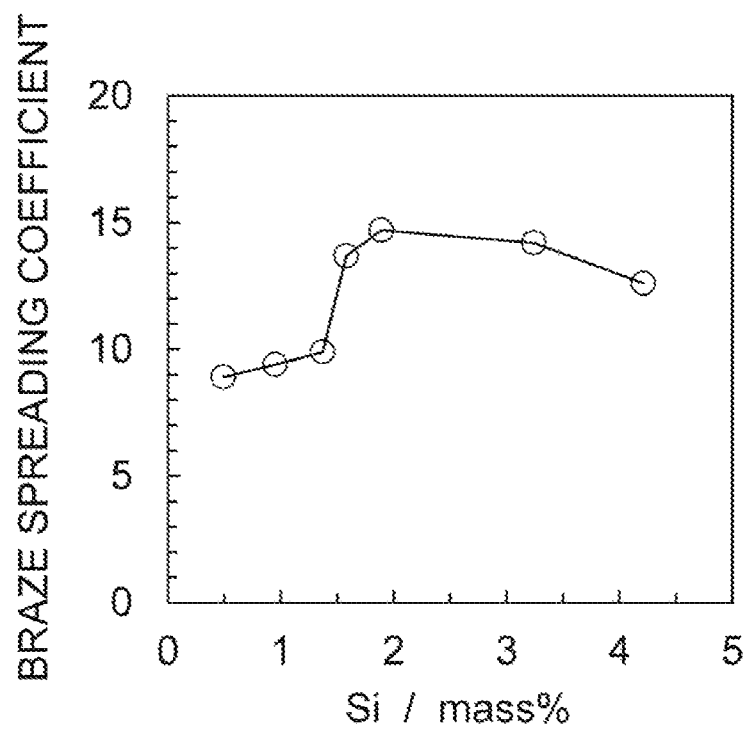
FIG. 1 is an illustration showing a relationship between an Si content and braze spreading coefficient in a 17Cr ferritic stainless steel.

Firstly, a relationship between an Si content in the steel and brazeability was evaluated. Brazeability was evaluated according to a braze spreading test. Prior to the braze spreading test, a sample piece was dry-polished using emery papers up to #600. Subsequently, the sample piece was placed in a device in compliance with JISZ2371 (salt spray testing method) and sprayed with tap water at a temperature of 35 degrees C. at a relative humidity (RH) of 99% for 30 minutes. A braze spreading coefficient of each of Ni braze and Cu braze was obtained after the sample piece using 0.1 g each of Ni braze and Cu braze was heated for 10 minutes in a vacuum atmosphere at 1130 degrees C. The braze spreading coefficient is defined by (a braze area after the test)/(a braze area before the test). FIG. 1 shows the braze spreading coefficient of the Ni braze and the Cu braze relative to the Si amount using a 17Cr ferritic stainless steel in which the Si amount was changed. As obvious from FIG. 1, addition of Si more than 1.5% into the steel clearly increases the braze spreading coefficient, but addition of Si more than 4% does not increase the braze spreading coefficient. In other words, it is understood that brazeability is improved by increasing the Si amount in the steel, but the effect of the Si amount to the brazeability is saturated when the Si amount exceeds 4%. Although the reason why Si improves brazeability is not revealed, it is inferred that Si has an effect to decrease an interface tension between the stainless steel and braze and the effect improves brazeability. In addition, it is also inferred that one reason to improve brazeability is that Si is an element easily solid-soluble in Ni braze and Cu braze.

In many cases, Si is present in a form of an oxide in the oxide film on the steel surface. An Si oxide, which is a stable oxide, is generally more difficult to reduce than a Cr oxide. When the oxide film is not sufficiently reduced before brazing, brazeability is decreased. On the contrary, when the oxide film containing Si is sufficiently reduced, brazeability is improved by the effect of Si per se, as compared with the oxide film containing no Si. Although increasing a vacuum degree in vacuum atmosphere is effective for improving reducibility of the oxide film, it is not easy to increase the vacuum degree since a carrier gas is often used for industrial purposes. It is inferred that a slight decrease in an improvement of the braze spreading coefficient at the Si amount exceeding 4% is caused because the oxide film is not sufficiently reduced to offset an improvement in brazeability by using Si.

Figure 2A:
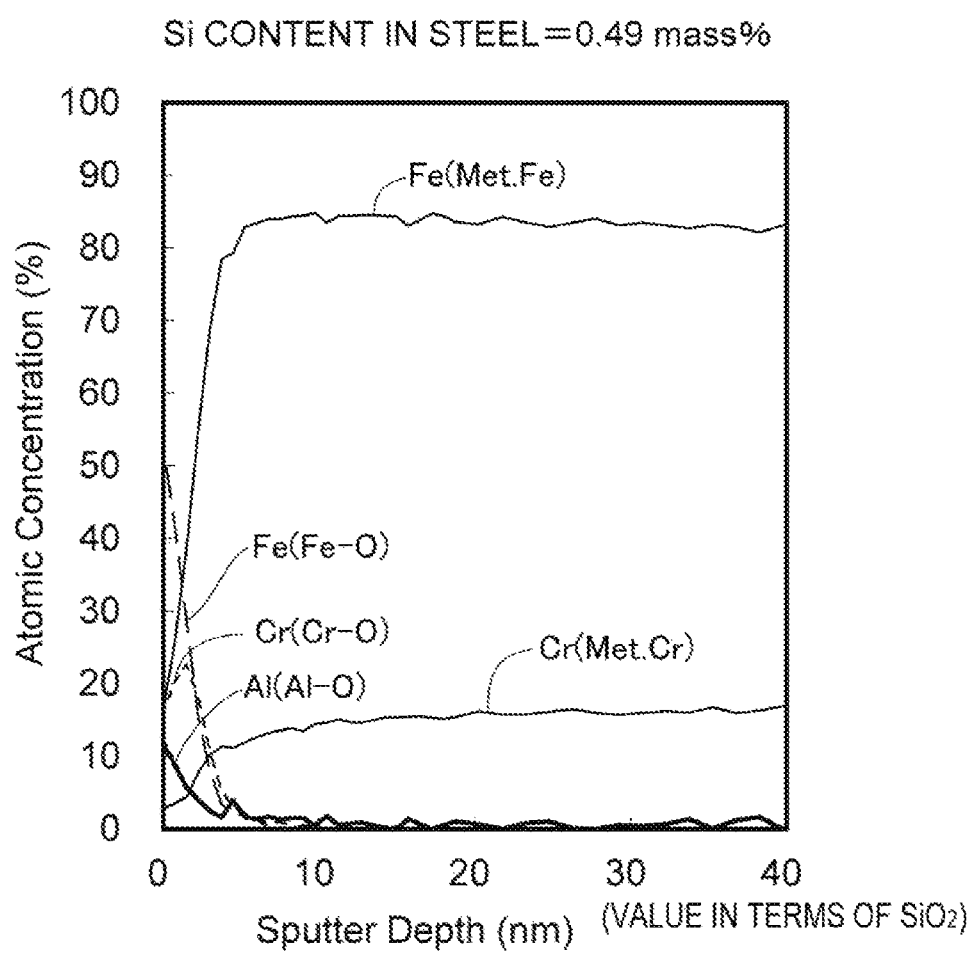
FIG. 2A shows an XPS analysis result in a vicinity of a surface of a steel including the Si content of 0.49 mass %.
Figure 2B:
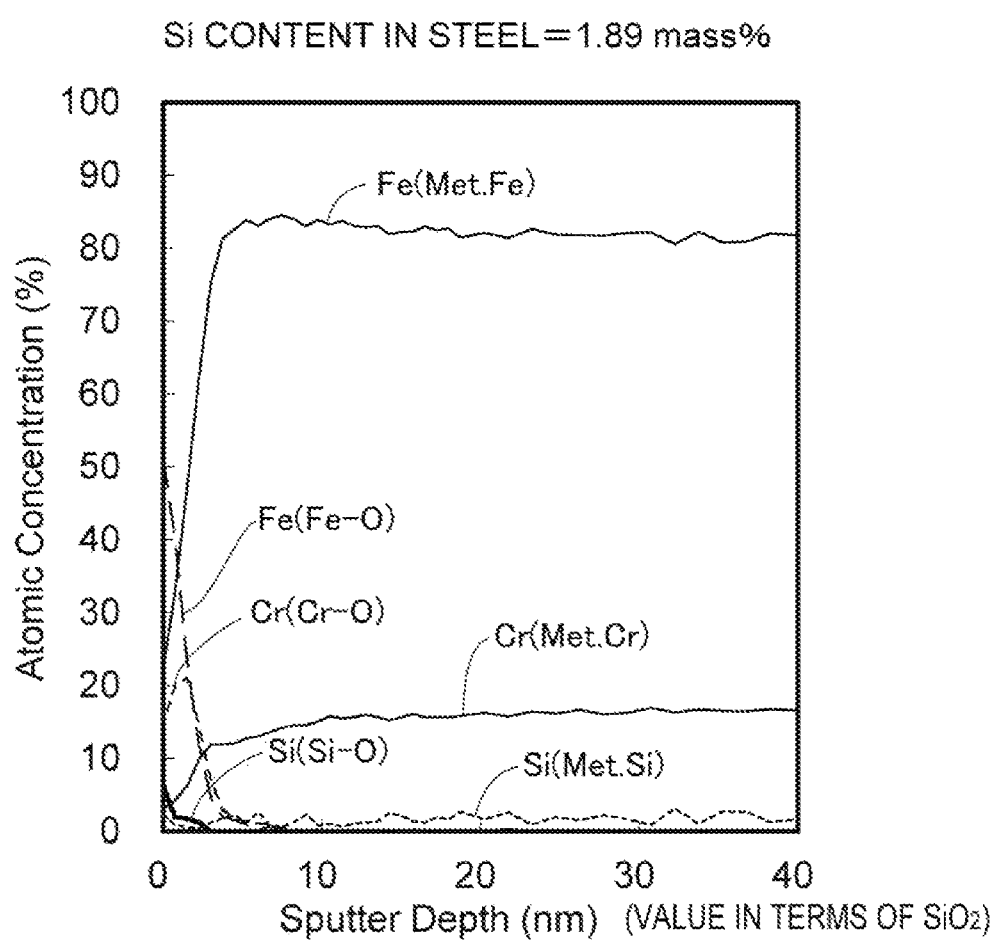
FIG. 2B shows an XPS analysis result in a vicinity of a surface of a steel including the Si content of 1.89 mass %.

A surface of an unbrazed material of 17Cr ferritic stainless steel in which the Si amount was changed was analyzed by X-ray photoelectron spectroscopy (hereinafter, referred to as XPS). The result reveals that, in the ratio (Si/Fe) between Si and Fe in the steel containing Si exceeding 1.5%, the atom % ratio $(Si_f/Fe_f)$ between the $Si_f$ amount and the $Fe_f$ amount contained in the oxide film on the surface was recognized to be 1.2 times or more as much as the mass % ratio $(Si_m/Fe_m)$ between the $Si_m$ amount and the $Fe_m$ amount contained in the steel. A thickness of the oxide film was about 3 nm irrespective of the Si amount. Herein, the thickness of the oxide film is defined as a thickness at which the O peak strength in the depth direction analysis is a half of the maximum strength. Thus Si concentration on the surface causes Si to more easily exhibit an effect on brazeability. FIGS. 2A and 2B show the XPS analysis results of a steel containing 0.49% of Si and a steel containing 1.89% of Si before the steels are subjected to brazing, among the 17Cr ferritic stainless steel in which the Si amount was changed. Herein, in FIG. 2A, the steel containing 0.49% of Si has 0.002% of Ti and 0.011% of Al. In FIG. 2B, the steel containing 1.89% of Si has 0.002% of Ti and 0.013% of Al. As shown in FIG. 2A, the concentrated Si was not observed in the oxide film of the steel having the Si amount of 1.5% or less, but Al, which was added at a slight amount as a deoxidizing element, was observed to be concentrated in the oxide film. In many cases, similar to Si, Al is also present in a form of an oxide in the oxide film and it is more difficult to reduce the Al oxide than the Si oxide. Accordingly, the Al oxide in the oxide film adversely affects brazeability. In contrast, as shown in FIG. 2B, concentration of Al was not observed in the oxide film of the steel having the Si amount exceeding 1.5%. It is considered that concentration of Al is inhibited by concentration of Si in the film.

Since it was found that concentration of Al on the surface was inhibitable by increasing the Si amount in the steel as described above, Ti to adversely affect brazeability similarly to Al was studied. As a result of the study, it was revealed that concentration of Ti and Al on the surface oxide film was not observed by containing the Si amount of 40 times or more as much as the total amount of Ti and Al in the steel, resulting in a favorable braze spreadability. It is desirable to contain the Si amount of 45 times or more as much as the total amount of Ti and Al as a component contained in the steel. The Si amount is more preferably 50 times or more.

As described above, an excellent brazeability is obtained by containing the Si amount of 1.5% or more in the steel and setting a ratio at 1.2 or more (hereinafter, referred to as "oxide-film Si-abundance ratio A*") obtained by dividing the atom % ratio ($Si_f/Fe_f$) between the $Si_f$ amount and the $Fe_f$ amount by the mass % ratio ($Si_m/Fe_m$) between the $Si_m$ amount and the $Fe_m$ amount contained in the steel. In order to enhance the effect of the excellent brazeability, the oxide-film Si-abundance ratio A* is preferably 1.5 or more. However, when the oxide-film Si-abundance ratio A* exceeds 5, reduction of the oxide film is not sufficient to impair brazeability. Accordingly, the oxide-film Si-abundance ratio A* is defined at 5 or less, desirably 4 or less.

A thickness of the oxide film is desirably 1 nm or more in order to express the effects of Si. Since the oxide film is not sufficiently reduced at the thickness of the oxide film exceeding 6 nm, the thickness of the oxide film is desirably from 1 nm to 6 nm. Further preferably, the thickness of the oxide film is from 1.5 nm to 5 nm.

As described above, the atom % ratio ($Si_f/Fe_f$) between the $Si_f$ amount and the $Fe_f$ amount contained in the oxide film on the surface is desirably in a range from 1.2 times to 5 times as much as the mass % ratio ($Si_m/Fe_m$) between the $Si_m$ amount and the $Fe_m$ amount contained in the steel. Such an oxide film can be obtained by containing Si of 1.5% or more in the steel and exposing the steel in a steam atmosphere of a relative humidity (hereinafter, referred to as RH) of 95% or more. The temperature is set from 30 to 80 degrees C., desirably 35 degrees C. or more. The exposure time needs to be three minutes or more at RH95% and 30 seconds or more at RH100%. Desirably, the exposure time is five minutes or more at RH95% and one minute or more at RH100%. Since the concentration of Si in the oxide film is promoted according to elapse of the time, the exposure time needs to be set within 180 minutes at the maximum, desirably 120 minutes or less.

An object of the invention is to provide a stainless steel exhibiting an excellent brazeability as described in the scope of the invention, in consideration of the above study.

The reason for specifically defining the compositions of a stainless steel exhibiting an excellent brazeability will be described below. A mark % with respect to each of the compositions means a mass % unless otherwise particularly indicated.

C: from 0.001% to 0.1%

C needs to be contained at 0.001% or more in order to improve a strength, preferably at 0.003% or more. However, since an excessive addition of C decreases an intergranular corrosion resistance, the C content is set at 0.1% or less, preferably at 0.08% or less.

Si: from more than 1.5% to 4.0%

Si is the most important element in the exemplary embodiment and improves brazeability. Si is also effective for oxidation resistance, which requires the Si content of more than 1.5%, preferably 1.7% or more, more preferably 1.9% or more. However, since an excessive addition of Si saturates the effect for brazeability and decreases weldability, the Si content is set at 4% or less, preferably 3.7% or less, more preferably 3.4% or less.

Mn: from 0.05% to 4.0%

Mn is an element useful as a deoxidizing element, which requires the Mn content of at least 0.05% or more, preferably 0.1% or more. However, since an excessive addition of Mn deteriorates corrosion resistance, the Mn content is set at 4.0% or less, preferably at 3.5% or less.

Cr: from 10.5% to 30%

Cr is a basic element for ensuring corrosion resistance. In heat exchangers (i.e., a main target to which the exemplary embodiment is applied), in most cases, combustion exhaust gas flows in a passage to be cooled by cooling water or the like and condensed, thereby producing corrosive condensate water. Accordingly, a steel sheet used for the heat exchangers are required to have corrosion resistance to exhaust gas condensate water. In addition, in the case of heat exchangers used outdoors, the heat exchangers are required to have salt corrosion resistance from an outer surface. For this reason, the Cr content is required to be set to be at least 10.5% or more, preferably 13% or more, more preferably 15% or more, further preferably 17% or more. As the Cr content increases, corrosion resistance can increase. However, since Cr deteriorates formability and productivity, the Cr content is set at 30% or less, preferably 29% or less, more preferably 28% or less, further preferably 26% or less.

Ni: 35% or less

Ni is an element improving corrosion resistance and an element effective for forming an austenite phase. The Ni content is preferably 0.1% or more. However, since an excessive addition of Ni decreases the productivity and increases costs since Ni is expensive, the Ni content is set at 35% or less, preferably at 34% or less. In a ferrite single phase steel, the Ni content is preferably in a range from 0.1% to 3%. In a dual phase of ferrite and austenite steel, the Ni content is preferably in a range from 1.5% to 9%. In an austenite single phase steel, the Ni content is preferably in a range from 7% to 34%. The lower limit is more preferably at 0.25% or more in the ferrite single phase steel, at 1.9% or more in the dual phase steel of ferrite and austenite, and at 7.5% or more in the austenite single phase steel. The upper limit is more preferably at 2.5% or less in the ferrite single phase steel, at 8.5% or less in the dual phase steel of ferrite and austenite, and at 32% or less in the austenite single phase steel.

The stainless steel of the exemplary embodiment contains one or both of Ti and Al in the following composition ranges.

Ti: from 0.002% to 0.030%

Since Ti is an element fixing C and N to improve intergranular corrosion resistance and useful for formability, the Ti content needs to be 0.002% or more, preferably 0.003% or more. However, since Ti deteriorates brazeability, the Ti content needs to be limited to 0.030% or less, preferably 0.025% or less, more preferably 0.020% or less.

Al: from 0.002% to 0.10%

Al is a useful element in terms of refinement for its deoxidizing effects and the like. The Al content is 0.002% or more, preferably 0.003% or more. However, since Al deteriorates brazeability, the Al content needs to be limited to 0.10% or less, preferably 0.075% or less, more preferably 0.05% or less, further preferably 0.03% or less, most preferably 0.015% or less.

N: from 0.001% to 0.4%

Since N is a useful element for strength and pitting corrosion resistance, the N content needs to be 0.001% or more, preferably 0.004% or more, more preferably 0.007% or more. However, since an excessive addition of N decreases intergranular corrosion resistance, the N content is set at 0.4% or less, preferably 0.35% or less, more preferably 0.3% or less.

The stainless steel may preferably further contain the following elements as needed.

Sn: from 0.001% to 0.5%

In order to improve brazeability, 0.001% or more of Sn can be added as needed. Addition of Sn is also effective for improving corrosion resistance. The Sn content is more preferably 0.01% or more, further preferably 0.05% or more. However, since an excessive addition of Sn decreases productivity and toughness, the Sn content is preferably 0.5% or less, more preferably 0.3% or less, further preferably 0.25% or less.

Co: from 0.01% to 0.5%

In order to improve brazeability, 0.01% or more of Co can be added as needed. The Co content is more preferably 0.03% or more. Since an excessive addition of Co increases costs, the Co content is preferably 0.5% or less, more preferably 0.4% or less.

Bi: from 0.001% to 0.01%

In order to improve brazeability, 0.001% or more of Bi can be added as needed. The Bi content is more preferably 0.002% or more. Since an excessive addition of Bi decreases productivity, the Bi content is preferably 0.01% or less, more preferably 0.008% or less.

B: from 0.0002% to 0.005%

In order to improve brazeability, 0.0002% or more of B can be added as needed. Addition of B is also effective for improving secondary formability. The B content is more preferably 0.0004% or more. However, since an excessive addition of B decreases intergranular corrosion resistance, the B content is preferably 0.005% or less, more preferably 0.004% or less.

Mo: from 0.3% to 8%

In order to improve strength and corrosion resistance, from 0.3% to 8% of Mo can be added as needed. Particularly, with respect to corrosion resistance to exhaust gas condensate water and salt corrosion resistance from the outer surface, which are required for heat exchangers (i.e., a main target to which the exemplary embodiment is applied), Mo has effects of improving rusting resistance and penetration resistance. The Mo content is preferably 0.8% or more, more preferably 1.2% or more. However, an excessive addition of Mo decreases the productivity and increases costs since Mo is expensive. The Mo content is preferably 7.2% or less, more preferably 6.4% or less.

W: from 0.3% to 4%

In order to improve corrosion resistance, from 0.3% to 4% of W can be added as needed. Particularly, with respect to corrosion resistance to exhaust gas condensate water and salt corrosion resistance from the outer surface, which are required for heat exchangers (i.e., a main target to which the exemplary embodiment is applied), W has effects of improving rusting resistance and penetration resistance. The W content is preferably 0.5% or more. However, an excessive addition of W deteriorates productivity and increases costs since W is expensive. The W content is preferably 3.6% or less.

V: from 0.05% to 0.5%

In order to improve corrosion resistance, 0.05% or more of V can be added as needed. However, since an excessive addition of V deteriorates productivity and increases costs since V is expensive, the V content is preferably 0.5% or less.

Nb: from 0.01% to 1%

Since Nb fixes C and N to improve intergranular corrosion resistance of a welding portion and improves high-temperature strength, the Nb content is preferably 0.01% or more, preferably 0.03% or more, more preferably 0.05% or more. However, since an excessive addition of Nb decreases weldability, an upper limit of the Nb content is set at 1%. The Nb content is preferably 0.5% or less, more preferably 0.45% or less.

Cu: from 0.1% to 6%

In order to improve corrosion resistance, 0.1% or more of Cu can be added as needed. The Cu content is preferably 0.2% or more, more preferably 0.3% or more. Since an excessive addition of Cu decreases formability, the Cu content is preferably 6% or less, preferably 5% or less, more preferably 3.5% or less.

Sb: from 0.001% to 0.5%

Since Sb is an element improving general corrosion resistance, 0.001% or more of Sb may be added as needed. However, the Sb content exceeding 0.5% increases costs. Accordingly, the Sb content is set at 0.5% or less. The Sb content is preferably 0.3% or less. In order to stably obtain the above effect, the Sb content is preferably 0.005% or more, more preferably 0.01% or more.

Zr: from 0.001% to 0.3%

Since Zr is an element improving corrosion resistance, 0.001% or more of Zr may be added as needed. However, the Zr content exceeding 0.3% increases costs. Accordingly, the Zr content is set at 0.3% or less. The Zr content is preferably 0.2% or less. In order to stably obtain the above effect, the Zr content is preferably 0.01% or more, more preferably 0.02% or more.

Ga: from 0.0001% to 0.01%

Since Ga is an element improving corrosion resistance and hydrogen embrittlement resistance, Zr may be added as needed. However, the Zr content exceeding 0.01% increases costs. Accordingly, the Ga content is set at 0.01% or less. The Ga content is preferably 0.005% or less. In order to stably obtain the above effect, the Ga content is preferably 0.0001% or more, more preferably 0.0005% or more.

Ta: from 0.0001% to 0.01%

Since Ta is an element improving corrosion resistance, Ta may be added as needed. However, the Ta content exceeding 0.01% increases costs. Accordingly, the Ta content is set at 0.01% or less. The Ta content is preferably 0.005% or less. In order to stably obtain the above effect, the Ta content is preferably 0.0001% or more, more preferably 0.0005% or more.

Ca: from 0.0002% to 0.005%

Since Ca is a useful element in terms of refinement for its deoxidation effects and the like and is effective for hot formability, from 0.0002% to 0.005% of Ca can be added as needed. The Ca content is preferably 0.0005% or more, and preferably 0.003% or less.

Mg: from 0.0002% to 0.005%

Since Mg is a useful element in terms of refinement for its deoxidation effects and the like, from 0.0002% to 0.005% of Mg can be added as needed. The Mg content is preferably 0.0004% or more, and preferably 0.002% or less.

REM: from 0.005% to 0.1%

Since REM (rare earth metal elements) is a useful element in terms of refinement for its deoxidation effects and the like, and also useful for brazeability and oxidation resistance, from 0.005% to 0.1% of REM can be added as needed. The REM content is preferably 0.008% or more, and preferably 0.08% or less.

Among inevitable impurities, from the view point of weldability, the P content is preferably 0.05% or less, more preferably 0.04% or less. In addition, from the view point of corrosion resistance, the S content is preferably 0.02% or less, more preferably 0.01% or less.

In addition to the above-described elements, elements can be contained as long as the effect of the invention is not hampered. Not only the contents of the above-described P and S which are typical impurity elements but also the contents of Zn, Pb, Se, H and the like are preferably as small as possible. On the other hand, to the extent capable of solving the problem of the invention, the contents of these elements are controlled. At least one of Zn≤100 ppm, Pb≤100 ppm, Se≤100 ppm, and H≤100 ppm is contained as needed.

The stainless steel of the exemplary embodiment is basically manufactured by a typical process. For instance, a molten steel with the above described chemical composition is produced in an electric furnace and the molten steel is refined in an AOD furnace, a VOD furnace or the like to be made into a steel piece by a continuous casting method or an ingot-making method. Subsequently, the steel piece is subjected to processes of hot rolling, annealing of hot-rolled steel sheet, pickling, cold rolling, finish annealing and pickling. As needed, annealing of hot-rolled steel sheet may be omitted and cold rolling, finish annealing and pickling may be repeatedly conducted.

The surface oxide film defined in the invention can be formed by exposing the above manufactured stainless steel in the steam atmosphere of the relative humidity (RH) of 95% or more as described above prior to brazing.

EXAMPLES

Effects of the invention will be clarified below with reference to Examples. It should be noted that the invention is by no means limited to Examples below, but may be implemented with appropriate modifications without departing from the scope of the invention.

30 kg of molten steels having chemical compositions shown in Tables 1-1 to 1-3 were melted in a vacuum melting furnace to prepare 17 kg of flat steel ingots. Subsequently, the ingots were subjected to hot rolling at a heating temperature of 1200 degrees C. to obtain hot-rolled steel sheets each having a thickness of 4.5 mm. The hot-rolled steel sheets were subjected to annealing at a temperature of 950 degrees C. and scales were removed by alumina shot blasting. Then, the steel sheets were subjected to cold rolling to have a thickness of 1 mm. Subsequently, the steel sheets were subjected to finish annealing to obtain sample pieces for evaluating braze spreadability and analyzing a surface film.

Tables 2-1 to 2-3 describe a steel number and surface processing conditions prior to brazing in each of Examples. The steel numbers of Tables 2-1 to 2-3 correspond to steel numbers of Tables 1-1 to 1-3. Tables 1-1 to 1-3 show $Si_m/(Ti_m+Al_m)$(mass %). Tables 2-1 to 2-3 show $(Si_m/Fe_m)$ (mass %). In Tables 1-1 to 1-3, numerals falling out of the scope of the invention are underlined.

TABLE 1-1

| | | | Chemical Composition (mass %) | | | | | | | | | | | |
|---|---|---|---|---|---|---|---|---|---|---|---|---|---|---|
| | | type | C | N | Si | Mn | P | S | Ni | Cr | Ti | Al | others | Si/(Ti + Al) |
| Examples | Ferritic stainless steel | Steel 1 | 0.004 | 0.002 | 1.53 | 0.05 | 0.002 | 0.0003 | 0.01 | 16.83 | 0.002 | 0.014 | — | 96 |
| | | Steel 2 | 0.005 | 0.015 | 1.95 | 0.26 | 0.024 | 0.0010 | 0.08 | 19.12 | 0.002 | 0.034 | 0.35Nb, 0.36Cu | 54 |
| | | Steel 3 | 0.006 | 0.014 | 1.61 | 0.21 | 0.021 | 0.0009 | 0.12 | 13.02 | 0.002 | 0.035 | 0.42Nb | 44 |
| | | Steel 4 | 0.004 | 0.004 | 3.86 | 0.18 | 0.023 | 0.0004 | 0.06 | 11.26 | 0.003 | 0.007 | — | 386 |
| | | Steel 5 | 0.003 | 0.003 | 1.55 | 0.06 | 0.003 | 0.0004 | 0.03 | 16.79 | 0.001 | 0.015 | 0.12Sn | 97 |
| | | Steel 6 | 0.014 | 0.009 | 1.72 | 0.98 | 0.024 | 0.0005 | 1.12 | 22.34 | 0.002 | 0.010 | 0.45Nb, 1.92Mo, 0.0004Mg | 143 |
| | Dual phase stainless steel | Steel 7 | 0.012 | 0.14 | 1.56 | 1.87 | 0.031 | 0.0010 | 3.98 | 22.45 | 0.005 | 0.021 | — | 60 |
| | | Steel 8 | 0.014 | 0.15 | 1.73 | 3.75 | 0.020 | 0.0011 | 2.45 | 20.68 | 0.001 | 0.019 | 0.97Cu, 0.0011B | 87 |
| | | Steel 9 | 0.012 | 0.26 | 2.75 | 0.68 | 0.021 | 0.0006 | 6.94 | 25.12 | 0.007 | 0.042 | 3.26Mo | 56 |
| | | Steel 10 | 0.020 | 0.045 | 2.34 | 2.85 | 0.025 | 0.0002 | 5.86 | 18.16 | 0.021 | 0.014 | 0.05Sn | 67 |
| | | Steel 11 | 0.014 | 0.13 | 1.74 | 1.15 | 0.022 | 0.0021 | 5.68 | 21.21 | 0.012 | 0.021 | 0.0013B, 2.46W, 0.0008Mg | 53 |
| Comparatives | Ferritic stainless steel | Steel 18 | 0.007 | 0.013 | 0.52 | 0.26 | 0.025 | 0.0012 | 0.07 | 19.28 | 0.001 | 0.018 | 0.38Nb, 0.37Cu | 27 |
| | | Steel 19 | 0.005 | 0.017 | 1.52 | 0.35 | 0.025 | 0.0010 | 0.05 | 16.78 | 0.004 | 0.045 | — | 31 |

(Note: Underlined numerals indicate falling out of the scope of the present invention.)

TABLE 1-2

| | | | Chemical Composition (mass %) | | | | | | | | | | | |
|---|---|---|---|---|---|---|---|---|---|---|---|---|---|---|
| | Type | | C | N | Si | Mn | P | S | Ni | Cr | Ti | Al | Others | Si/(Ti + Al) |
| Examples | Austenite stainless steel | Steel 12 | 0.011 | 0.042 | 3.12 | 0.42 | 0.030 | 0.0012 | 13.11 | 17.24 | 0.004 | 0.023 | 1.43Mo | 116 |
| | | Steel 13 | 0.051 | 0.022 | 3.24 | 0.86 | 0.024 | 0.0015 | 13.92 | 19.14 | 0.005 | 0.019 | 0.003Bi | 135 |
| | | Steel 14 | 0.019 | 0.054 | 2.11 | 0.56 | 0.028 | 0.0008 | 12.26 | 20.11 | 0.011 | 0.021 | — | 66 |
| | | Steel 15 | 0.014 | 0.19 | 1.66 | 0.36 | 0.021 | 0.0004 | 25.12 | 23.12 | 0.014 | 0.018 | 6.31Mo, 0.13Co | 52 |
| | | Steel 16 | 0.042 | 0.033 | 2.56 | 0.45 | 0.029 | 0.0021 | 27.45 | 28.68 | 0.021 | 0.036 | 0.28Co, 0.011REM | 45 |
| | | Steel 17 | 0.039 | 0.11 | 1.78 | 1.12 | 0.023 | 0.0015 | 9.46 | 18.11 | 0.016 | 0.025 | 0.12Nb | 43 |
| Comparative | | Steel 20 | 0.041 | 0.032 | 0.34 | 1.07 | 0.026 | 0.0045 | 8.38 | 18.05 | 0.002 | 0.002 | — | 85 |

(Note: Underlined numerals indicate falling out of the scope of the present invention.)

TABLE 1-3

| | Type | | Chemical Composition (mass %) | | | | | | | | | | | Si/(Ti + Al) |
|---|---|---|---|---|---|---|---|---|---|---|---|---|---|---|
| | | | C | N | Si | Mn | P | S | Ni | Cr | Ti | Al | Others | |
| Examples | Ferritic stainless steel | Steel 21 | 0.007 | 0.012 | 2.42 | 0.45 | 0.025 | 0.0010 | 0.21 | 17.34 | 0.004 | 0.019 | 0.36Nb, 0.89Mo, 0.12Sb | 105 |
| | | Steel 22 | 0.010 | 0.008 | 3.12 | 0.36 | 0.029 | 0.0006 | 0.09 | 14.14 | 0.018 | 0.018 | 0.21V, 0.19Zr, 0.001Ca | 87 |
| | | Steel 23 | 0.005 | 0.007 | 3.79 | 0.22 | 0.025 | 0.0012 | 0.05 | 11.34 | 0.027 | 0.014 | — | 92 |
| | | Steel 24 | 0.011 | 0.013 | 2.75 | 1.24 | 0.026 | 0.0004 | 0.14 | 12.67 | 0.008 | 0.003 | 0.39Nb | 250 |
| | Dual phase stainless | Steel 25 | 0.025 | 0.078 | 3.24 | 0.89 | 0.026 | 0.0011 | 4.89 | 19.89 | 0.004 | 0.016 | 0.16V, 0.0012Ca, 0.001Ga | 162 |
| | Austenite stainless steel | Steel 26 | 0.024 | 0.065 | 1.95 | 3.88 | 0.031 | 0.0021 | 18.56 | 22.97 | 0.002 | 0.008 | 0.12V, 1.56W, 0.002Ta | 195 |
| | | Steel 27 | 0.024 | 0.055 | 3.90 | 0.75 | 0.026 | 0.0011 | 12.21 | 19.89 | 0.002 | 0.089 | — | 43 |
| | | Steel 28 | 0.019 | 0.023 | 2.86 | 1.02 | 0.025 | 0.0031 | 10.12 | 15.12 | 0.026 | 0.001 | — | 106 |
| Comparatives | Ferritic stainless steel | Steel 29 | 0.006 | 0.013 | 1.99 | 0.27 | 0.025 | 0.0011 | 0.11 | 19.19 | <u>0.034</u> | 0.014 | 0.36Nb, 0.33Cu | 41 |
| | | Steel 30 | 0.008 | 0.016 | 2.01 | 0.27 | 0.025 | 0.0009 | 0.09 | 19.08 | 0.001 | <u>0.103</u> | 0.37Nb, 0.36Cu | <u>19</u> |
| | Dual phase stainless | Steel 31 | 0.017 | 0.17 | <u>0.31</u> | 3.24 | 0.024 | 0.0002 | 2.08 | 20.92 | 0.004 | 0.027 | 1.06Cu | <u>10</u> |
| | Austenite stainless steel | Steel 32 | 0.017 | 0.049 | 2.19 | 0.55 | 0.030 | 0.0012 | 12.31 | 20.14 | <u>0.12</u> | 0.019 | — | <u>16</u> |
| | | Steel 33 | 0.016 | 0.055 | 2.16 | 0.59 | 0.024 | 0.0011 | 12.19 | 20.01 | 0.005 | <u>0.64</u> | — | <u>3</u> |
| | | Steel 34 | 0.015 | 0.061 | 2.21 | 0.61 | 0.027 | 0.0015 | 12.24 | 20.09 | 0.004 | 0.067 | — | <u>31</u> |

(Note: Underlined numerals indicate falling out of the scope of the present invention.)

TABLE 2-1

| | Type | | | Pre-processing | Steel $Si_m/Fe_m$ mass % | Surface Film thickness/ nm | Surface Film $Si_f/Fe_f$ atom % | A* | Braze spreading coefficient Cu braze | Braze spreading coefficient Ni braze |
|---|---|---|---|---|---|---|---|---|---|---|
| Example | Ferritic stainless steel | 1 | Steel 1 | 50° C.-RH95%-30 min | 0.019 | 2.8 | 0.065 | 3.5 | 4.8 | 12.8 |
| | | 2 | Steel 2 | " | 0.025 | 2.6 | 0.041 | 1.6 | 5.0 | 13.4 |
| | | 3 | Steel 3 | " | 0.019 | 3.0 | 0.025 | 1.3 | 4.3 | 10.6 |
| | | 4 | Steel 3 | 35° C.-RH99% -- spray tap water for 30 min | 0.019 | 3.2 | 0.039 | 2.0 | 4.5 | 12.1 |
| | | 5 | Steel 4 | 50° C.-RH95%-30 min | 0.046 | 2.1 | 0.176 | 3.9 | 9.8 | 14.8 |
| | | 6 | Steel 5 | " | 0.019 | 2.7 | 0.059 | 3.1 | 5.7 | 14.0 |
| | | 7 | Steel 6 | " | 0.023 | 1.8 | 0.045 | 1.9 | 5.2 | 13.6 |
| | Dual phase stainless steel | 8 | Steel 7 | " | 0.022 | 2.9 | 0.036 | 1.6 | 4.8 | 11.2 |
| | | 9 | Steel 8 | " | 0.025 | 3.6 | 0.050 | 2.0 | 5.3 | 12.2 |
| | | 10 | Steel 9 | " | 0.045 | 2.7 | 0.092 | 2.0 | 4.7 | 11.5 |
| | | 11 | Steel 10 | " | 0.035 | 2.6 | 0.112 | 3.2 | 7.3 | 13.6 |
| | | 12 | Steel 11 | " | 0.026 | 3.6 | 0.060 | 2.3 | 5.2 | 11.7 |
| Comparatives | Ferritic stainless steel | 1 | <u>Steel 18</u> | " | 0.007 | 2.6 | 0.007 | <u>1.1</u> | 3.7 | 9.2 |
| | | 2 | <u>Steel 19</u> | " | 0.019 | 4.1 | 0.024 | 1.3 | 3.3 | 8.9 |
| | | 3 | Steel 3 | — | 0.019 | 2.7 | 0.019 | <u>1.0</u> | 3.2 | 8.0 |
| | | 4 | Steel 3 | 50° C.-RH95%-1 min | 0.019 | 2.8 | 0.021 | <u>1.1</u> | 3.5 | 8.7 |
| | | 5 | Steel 3 | 50° C.-RH95%-6 hrs | 0.019 | 5.1 | 0.110 | <u>5.8</u> | 3.7 | 9.4 |

(Note: Underlined numerals indicate falling out of the scope of the present invention.)
A* = $(Si_f/Fe_f)/(Si_m/Fe_m)$

TABLE 2-2

| | Type | | | Pre-processing | Steel $Si_m/Fe_m$ mass % | Surface Film thickness/ nm | Surface Film $Si_f/Fe_f$ atom % | A* | Braze spreading coefficient Cu braze | Braze spreading coefficient Ni braze |
|---|---|---|---|---|---|---|---|---|---|---|
| Examples | Austenite stainless steel | 13 | Steel 12 | 50° C.-RH95%-30 min | 0.048 | 3.3 | 0.126 | 2.6 | >57 | >128 |
| | | 14 | Steel 13 | " | 0.052 | 3.1 | 0.136 | 2.6 | >117 | >99 |
| | | 15 | Steel 14 | " | 0.033 | 3.4 | 0.061 | 1.9 | >74 | >79 |
| | | 16 | Steel 15 | " | 0.039 | 2.7 | 0.088 | 2.3 | >48 | >75 |

TABLE 2-2-continued

| | Type | | Pre-processing | Steel $Si_m/Fe_m$ mass % | Surface Film thickness/ nm | Surface Film $Si_f/Fe_f$ atom % | A* | Braze spreading coefficient Cu braze | Braze spreading coefficient Ni braze |
|---|---|---|---|---|---|---|---|---|---|
| | | 17 | Steel 16 " | 0.063 | 3.2 | 0.135 | 2.1 | >85 | >93 |
| | | 18 | Steel 17 " | 0.026 | 2.8 | 0.092 | 3.6 | >62 | >86 |
| Comparative | | 6 | Steel 20 " | 0.005 | 2.9 | 0.005 | 1.1 | 9.0 | 14.6 |

(Note: Underlined numerals indicate falling out of the scope of the present invention.)
A* = $(Si_f/Fe_f)/(Si_m/Fe_m)$

TABLE 2-3

| | Type | | Pre-processing | Steel $Si_m/Fe_m$ mass % | Surface Film thickness/ nm | Surface Film $Si_f/Fe_f$ atom % | A* | Braze spreading coefficient Cu braze | Braze spreading coefficient Ni braze |
|---|---|---|---|---|---|---|---|---|---|
| Examples | Ferritic stainless steel | 19 | Steel 21 50° C.-RH95%-30 min | 0.031 | 2.8 | 0.083 | 2.7 | 4.4 | 11.1 |
| | | 20 | Steel 22 " | 0.038 | 3.1 | 0.092 | 2.4 | 4.2 | 10.9 |
| | | 21 | Steel 23 " | 0.045 | 3.3 | 0.115 | 2.6 | 4.3 | 10.8 |
| | | 22 | Steel 24 " | 0.033 | 3.6 | 0.094 | 2.8 | 8.4 | 13.2 |
| | Dual phase stainless steel | 23 | Steel 25 " | 0.046 | 3.0 | 0.110 | 2.4 | 5.8 | 12.7 |
| | Austenite stainless steel | 24 | Steel 26 " | 0.038 | 2.6 | 0.081 | 2.1 | >65 | >77 |
| | | 25 | Steel 27 " | 0.062 | 2.2 | 0.156 | 2.5 | >98 | >107 |
| | | 26 | Steel 28 " | 0.039 | 3.1 | 0.091 | 2.3 | >81 | >84 |
| Comparatives | Ferritic stainless steel | 7 | Steel 29 " | 0.026 | 3.3 | 0.049 | 1.9 | 2.9 | 8.6 |
| | | 8 | Steel 30 " | 0.026 | 3.5 | 0.055 | 2.1 | 1.4 | 6.7 |
| | Dual phase stainless steel | 9 | Steel 31 " | 0.004 | 3.3 | 0.008 | 1.9 | 3.9 | 9.0 |
| | Austenite stainless steel | 10 | Steel 32 " | 0.034 | 3.9 | 0.072 | 2.1 | 8.6 | 12.9 |
| | | 11 | Steel 33 " | 0.034 | 4.1 | 0.079 | 2.4 | 8.2 | 12.1 |
| | | 12 | Steel 34 " | 0.034 | 3.7 | 0.085 | 2.5 | 9.4 | 14.4 |
| | | 13 | Steel 15 — | 0.039 | 2.7 | 0.041 | 1.1 | 9.2 | 14.1 |

(Note: Underlined numerals indicate falling out of the scope of the present invention.)
A* = $(Si_f/Fe_f)/(Si_m/Fe_m)$ Processing Prior To Brazing Six sample pieces each having a 60-mm width and a 60-mm length were cut out from each of the cold-rolled steel sheets. After dry-polished using emery papers up to #600, the sample pieces were subjected to pre-processing as shown in Tables 2-1 to 2-3. In Examples 1 to 3 and 5 to 26 and Comparatives 1, 2 and 6 to 12, the sample pieces were held at 50 degrees C. at RH95% for 30 minutes. For comparison, Steel 3 and Steel 15 were only dry-polished without being held at 50 degrees C. at RH95% for 30 minutes, thereby preparing samples (Comparatives 3 and 13). Moreover, after Steel 3 was dry-polished using the emery papers up to #600, Steel 3 was held at 50 degrees C. at RH95% for one minute to prepare a sample (Comparative 4) and Steel 3 was held at 50 degrees C. at RH95% for 6 hours to prepare a sample (Comparative 5). Further, after Steel 3 was dry-polished using the emery papers up to #600, Steel 3 was placed in a device in compliance with JISZ2371 (salt spray testing method) and sprayed with tap water at a temperature of 35 degrees C. at RH99% for 30 minutes to prepare a sample (Example 4).

Analysis of Surface Film of Material

With respect to the steel sheets subjected to the same processing as in the evaluation of braze spreadability, a surface oxide film was analyzed by X-ray photoelectron spectroscopy (XPS). The XPS apparatus was manufactured by ULVAC-PHI, Inc. XPS was performed using mono-AlKα ray as an X-ray source under the condition in which a beam diameter of an X-ray was approximately 100 μm and an output angle thereof was 45 degrees C. From the result of quantitative analysis of the outermost surface by the XPS, a value (atom %) of $Si_f/Fe_f$ in the oxide film was obtained. Moreover, the sample pieces were subjected to depth direction analysis by Ar sputtering. A thickness of the oxide film was defined as a thickness at which the O peak strength in the depth direction analysis was a half of the maximum strength.

Right columns of Tables 2-1 to 2-3 show thicknesses and values of $Si_f/Fe_f$ of the oxide film. Tables 2-1 to 2-3 also show values of A*=$(Si_f/Fe_f)/(Si_m/Fe_m)$.

Braze Spreadability

The steel sheets subjected to pre-brazing were degreased using an organic solvent before the braze spreading test. After the steel sheets were degreased, 0.1 g each of Cu braze (BCu-1) and Ni braze ((BNi-5 system) was placed at the center of each of the steel sheets and heated at 1130 degrees C. in a vacuum furnace for 10 minutes. The Cu braze and the Ni braze each were placed on three steel sheets and a vacuum degree of the furnace was about 50 Pa. The steel sheets were cooled after the heating and a braze area of each of the steel sheets after the heating was obtained by an image analysis. A braze spreading coefficient was calculated by the following equation based on the obtained braze area.

braze spreading coefficient=braze area after heating/initial braze area

Right columns of Tables 2-1 to 2-3 show the braze spreading coefficients. It should be noted that each of the braze spreading coefficients is an average value of the three sample pieces. With respect to the austenitic stainless steels in Examples 13 to 18, since braze spread from the middle to the ends, the braze spreading coefficients were shown with a sign of inequality Comparative 1 (Steel 18) in Table 2-1 shows a typical low-Si ferritic stainless steel and Comparative 6 (Steel 20) in Table 2-2 shows a typical low-Si austenitic stainless steel. As obvious from Table 2-2, the austenitic stainless steel in Comparative 6 exhibits more favorable braze spreading coefficient. An object of the invention is to obtain brazeability of the ferritic stainless steel and the dual phase stainless steel equal to brazeability of a typical austenitic stainless steel, and to enhance brazeability of the austenitic stainless steel. Accordingly, a target braze spreading coefficient of the ferritic stainless steel and the dual phase stainless steel is defined as 4 or more for Cu braze and 10 or more for Ni braze. A target braze spreading coefficient of the austenitic stainless steel is defined as 10 or more for Cu braze and 15 or more for Ni braze.

In Tables 2-1 to 2-3, Examples 1 to 7 and 19 to 22 using the ferritic stainless steels and Examples 8 to 12 and 23 using the dual phase (ferrite+austenite) stainless steel show an excellent braze spreadability of 4 or more for Cu braze and 10 or more for Ni braze. Particularly, in Example 6 using the steel obtained by adding 0.12% of Sn to the steel of Example 1, it is observed that both Cu braze spreadability and Ni braze spreadability were improved by the Sn addition.

In Comparative 1 using the ferritic stainless steel corresponding to SUS430J1L and containing a different amount of Si from that in Example 2, the braze spreading coefficient for Cu braze is 4 or less and the braze spreading coefficient for Ni braze is 10 or less, which shows a poor braze spreadability. Comparative 2 shows a case where the formula 1 is not satisfied. Comparatives 3 and 4 show cases where $A^*=(Si_f/Fe_f)/(Si_m/Fe_m)$ is less than 1.2. Comparative 5 shows a case where $A^*$ exceeds 5. In all the cases, the braze spreading coefficient for Cu braze is 4 or less and the braze spreading coefficient for for Ni braze is 10 or less, which shows a poor braze spreadability. Comparative 7 shows a case where the Ti amount is different from that in Example 2. Comparative 8 shows a case where the Al amount is different from that in Example 2. In both the cases, the braze spreading coefficient for Cu braze is 4 or less and the braze spreading coefficient for Ni braze is 10 or less, which shows a poor braze spreadability. In Comparative 9 using a dual phase stainless steel containing a different amount of Si from that in Example 9, the braze spreading coefficient for Cu braze is 4 or less and the braze spreading coefficient for Ni braze is 10 or less, which shows a poor braze spreadability.

It is observed that the austenitic stainless steels in Examples 13 to 18 and 24 to 26 exhibited the braze spreading coefficients for both Cu braze and Ni braze which are five times or more as much as the braze spreading coefficients of the austenitic stainless steel corresponding to SUS304 in Comparative 6, and the braze spreadability was remarkably improved. Comparative 10 shows a case where the Ti amount is different from that in Example 15. Comparative 11 shows a case where the Al amount is different from that in Example 15. Comparative 12 shows a case where the value obtained from the formula 1 is different from that in Example 15. In all the cases, the braze spreading coefficient for Cu braze is 10 or less and the braze spreading coefficient for Ni braze is 15 or less, which shows a poor braze spreadability. In Comparative 13 showing a case where $A^*$ is less than 1.2, the braze spreading coefficient for Cu braze is 10 or less and the braze spreading coefficient for Ni braze is 15 or less, which shows a poor braze spreadability.

The invention claimed is:

1. A stainless steel, comprising, in mass %:
C: from 0.001% to 0.1%;
Si: from 2.11% to 4.0%;
Mn: from 0.05% to 4.0%;
Cr: from 10.5% to 30%;
Ni: 35% or less;
N: from 0.001% to 0.4%;
Ti: 0.002% to 0.008%; and
Al: 0.002% to 0.10%; and
a balance being Fe and inevitable impurities, wherein
an Si content, a Ti content and an Al content satisfy Formula 1, and
an oxide film with a composition satisfying Formula 2 is formed on a surface of the stainless steel, $$Si_m/(Ti_m+Al_m) \geq 40 \qquad \text{Formula 1}$$

$$1.2 \times Si_m/Fe_m \leq Si_f/Fe_f \leq 5 \times Si_m/Fe_m \qquad \text{Formula 2}$$

where: in Formula 1 and Formula 2, an element with a suffix "f" expresses a content of the element in the oxide film, the content being indicated by a unit of atom %, and an element with a suffix "m" expresses a content of the element in the stainless steel that is a base material, the content being indicated by a unit of mass %.

2. The stainless steel according to claim 1, further comprising, in mass %: at least one of:
a first group that is at least one of Sn: from 0.001% to 0.5%, Co: 0.01% to 0.5%, Bi: 0.001% to 0.01%, and B: 0.0002% to 0.005%;
a second group that is at least one of Mo: 0.3% to 8%, W: 0.3% to 4%, V: 0.05% to 0.5%, Nb: 0.01% to 1%, Cu: 0.1% to 6%, Sb: 0.001% to 0.5%, Zr: 0.001% to 0.3%, Ga: 0.0001% to 0.01%, and Ta: 0.0001% to 0.01%; and
a third group that is at least one of Ca: 0.0002% to 0.005%, Mg: 0.0002% to 0.005%, and REM: 0.005% to 0.1%.

3. The stainless steel according to claim 2, wherein at least one of the Si content, the Ti content and the Al content in mass % satisfy respective ranges below:
Si: from 2.11% to 3.4%;
Ti: from 0.003% to 0.008%; and
Al: from 0.003% to 0.03%.

4. The stainless steel according to claim 3, used as a joined member for brazing with an Ni braze or a Cu braze.

5. The stainless steel according to claim 4, used for a heat exchanger.

6. The stainless steel according to claim 3, used for a heat exchanger.

7. The stainless steel according to claim 2, used as a joined member for brazing with an Ni braze or a Cu braze.

8. The stainless steel according to claim 7, used for a heat exchanger.

9. The stainless steel according to claim 2, used for a heat exchanger.

10. The stainless steel according to claim 1, wherein at least one of the Si content, the Ti content and the Al content in mass % satisfy respective ranges below:
Si: from 2.11% to 3.4%;
Ti: from 0.003% to 0.008%; and
Al: from 0.003% to 0.03%.

11. The stainless steel according to claim 3, used as a joined member for brazing with an Ni braze or a Cu braze.

12. The stainless steel according to claim 11, used for a heat exchanger.

13. The stainless steel according to claim 10, used for a heat exchanger.

14. The stainless steel according to claim 1, used as a joined member for brazing with an Ni braze or a Cu braze.

15. The stainless steel according to claim 14, used for a heat exchanger.

16. The stainless steel according to claim 1, used for a heat exchanger.

17. The stainless steel according to claim 1, used for an automobile component that is an exhaust gas recirculation cooler, an exhaust heat recovery equipment, or a fuel delivery component.

18. The stainless steel according to claim 1, used for a $CO_2$ refrigerant heat pump-type hot water supplier, a secondary heat exchanger of a latent heat recovery-type hot-water supplier, or a plate type heat exchanger.

* * * * *